United States Patent [19]

Tomlinson

[11] 4,402,237
[45] Sep. 6, 1983

[54] VARIABLE RATIO POWER TRANSMISSION MECHANISMS

[75] Inventor: Malcolm Tomlinson, Luton, England
[73] Assignee: General Motors Corporation, Detroit, Mich.
[21] Appl. No.: 278,622
[22] Filed: Jun. 29, 1981
[51] Int. Cl.³ .............................................. F16H 37/00
[52] U.S. Cl. ...................................... 74/689; 74/690; 74/681; 74/785
[58] Field of Search ................. 74/689, 690, 691, 687, 74/681, 760, 785

[56] References Cited

U.S. PATENT DOCUMENTS

| 3,203,277 | 8/1965 | General | 74/689 |
| 3,670,594 | 6/1972 | Roper | 74/689 |
| 4,355,547 | 10/1982 | Poole et al. | 74/690 |

FOREIGN PATENT DOCUMENTS 647011 8/1962 Canada ................................ 74/689
1515687 6/1978 United Kingdom .

Primary Examiner—Lawrence J. Staab
Assistant Examiner—Joseph M. Rolnicki
Attorney, Agent, or Firm—Donald F. Scherer

[57] ABSTRACT

A variable ratio power transmission mechanism having particular application to motor vehicle drive comprises a mechanical variator of the variable pitch V-pulley and drive chain type working in conjunction with three interconnected epicyclic planetary gearsets which operate with torque recirculation to substantially double the ratio spread of the variator. Ratio control means for the variator, responsive to engine and vehicle operating parameters and to a driver-operable control, allow a vehicle engine to operate always at an appropriate speed for the prevailing conditions, thus at optimum efficiency for economy during cruising operation, but at maximum power (in response to a driver signal) when optimum performance is required.

11 Claims, 17 Drawing Figures

Fig. 8.
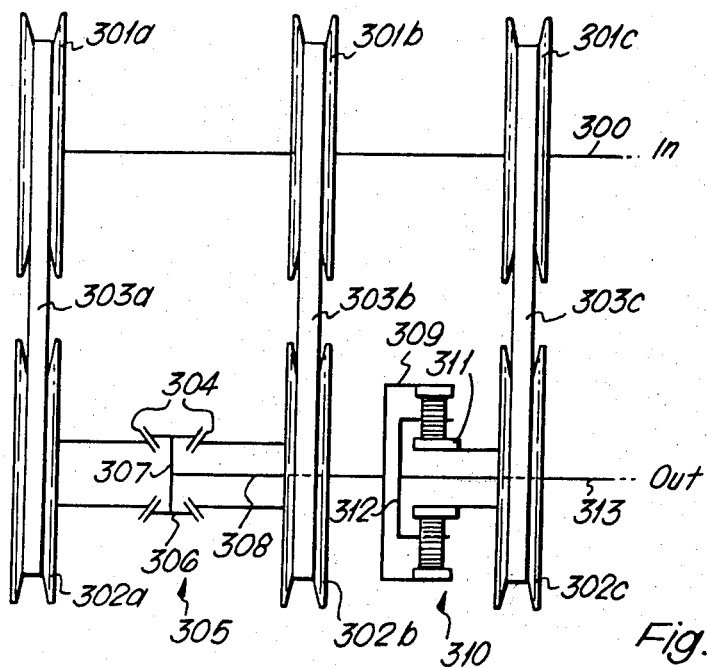
Fig. 9.
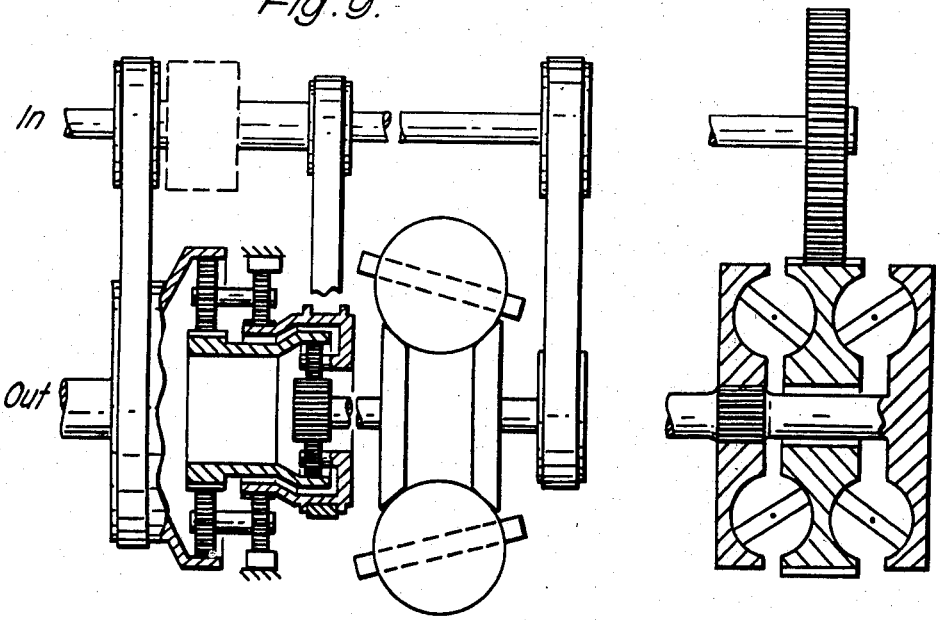
Fig. 10.

VARIABLE RATIO POWER TRANSMISSION MECHANISMS

This invention relates to variable-ratio power transmission mechanisms, primarily for use in motor vehicles.

Continuously variable transmissions, in conjunction with effective control systems, have potential for use in motor vehicles, since such transmissions can be designed to provide automatic stepless variation of the transmission ratio in accordance with engine and vehicle operating parameters so as to keep the engine speed constantly at an appropriate value in relation to the prevailing operating conditions, for example under cruising conditions to allow the engine to operate close to the most economical engine speed for every power demand made on the engine and yet under conditions of high torque demand to make peak engine power available at the vehicle wheels. For practical application, transmission capacity and transmission efficiency are relevant design factors.

The present invention is concerned with a mechanical continuously variable ratio drive which essentially comprises a mechanical variator, for example a pair of variable-pitch V-pulleys interconnected by a drive belt or chain, working in conjunction with interconnected planetary (specifically, epicyclic) gearsets providing torque recirculation.

According to the present invention, in a variable ratio power transmission mechaniam, a rotary drive member is connected to drive an input member of a mechanical variator that is operable to provide a steplessly variable ratio drive at an output member of the variator, the output member of the variator is connected to drive an output member of the transmission mechanism by way of interconnected first, second and third planetary gearsets each comprising first and second members meshing with at least one planetary member that is rotatably mounted on a carrier member, the first member of the first planetary gearset is connected to the output member of the variator, the second member of the first planetary gearset is connected to the first member of the third planetary gearset, the carrier member of the first planetary gearset is connected to the first member of the second planetary gearset, the second member of the second planetary gearset is held stationary, the carrier members of the second and third planetary gearsets are interconnected, the second member of the third planetary gearset is connected to the output member of the transmission mechanism, and one of the carrier members has a drive connection to the input member of the variator effective to recirculate torque from the said carrier member to the input member of the variator.

The first and second members of the respective planetary gearsets are preferably the sun gears and the ring gears respectively.

By appropriate choice of the ratios of the planetary gearsets, it is possible to obtain at the output member of the transmission mechanism a ratio spread which is substantially greater than the ratio spread (for example 6:1) provided by the variator itself. A ratio spread which is about twice that of the variator can be achieved, and in principle even higher ratio spreads are possible, although in practice recirculation losses tend to limit the effective ratio spread which is available.

In operation, the carrier member of the first planetary gearset rotates at a speed proportional to variator input speed, and the torque recirculation connection back to the input member of the variator may be made from this carrier member. However, the carrier members of the second and third planetary gearsets also rotate at a speed proportional to variator input speed, and the torque recirculation connection can alternatively, be made from these interconnected carrier members, albeit with a slightly lower efficiency at maximum ratio because of somewhat greater recirculation losses.

In either case, a speed-change system will normally be required in the torque recirculation connection to take account of differing speeds at the carrier member and at the variator input.

The input member of the variator will normally be engine-driven with the interposition of a forward-/reverse drive arrangement that is selectively operable to establish forward drive, reverse drive, or a neutral condition in which no drive is transmitted. For this purpose a differential gear arrangement may be provided with selectively operable forward-ratio and reverse-ratio friction drive-establishing arrangements (friction clutch and brake), or alternatively an epicyclic gear arrangement could be used.

A hydraulic coupling may be interposed between the engine and the variator input, for example between the engine and the forward/reverse drive arrangement. This may have a selectively engageable lockup arrangement to cut out hydraulic losses during cruising operation, in which case a torsion damper may be interposed, adjacent the coupling.

A useful increase in the overall efficiency of the transmission mechanism is obtainable by the use of a bypass clutch that is selectively operable to establish a direct mechanical connection between the output member of the transmission mechanism and a rotary drive member forming a drive input for the variator. In the bypass mode this clutch disconnects the input shaft, the variator and the recirculation member from each other.

To reduce spin losses in the bypass mode, a brake may be included to selectively hold stationary a reaction member of the interconnected planetary gearsets. This may take the form of a multidisc (multiplate) brake interposed between a fixed housing portion and the ring gear constituting the second member of the intermediate planetary gearset. When such reaction brake is released, variator output speed will be reduced to approximately that of the output shaft, corresponding for example to an 89% reduction in variator output speed.

Various specific layouts of the transmission mechanism are possible, depending on the desired application. Thus the output may be taken out at right angles to the input, with a bevel gearset between the input and the variator, and a grooved pulley and chain system, or a second bevel gearset, in the torque recirculation connection back to the input. Alternatively, for an output parallel to the input, the variator input may be coaxial with the engine axis, with a toothed drive chain or belt providing the torque recirculation path back to the variator input. With either arrangement, an output differential may have its rotary housing connected to the output member of the transmission mechanism, with the differential output members constituted by oppositely extending half shafts parallel to the engine and variator input axis, and one of the half shafts extending through a corresponding central aperture in each of the sun gears of the planetary gearsets and in the output member of the variator.

For a transmission mechanism as aforesaid connected to transmit drive from a vehicle engine to a pair of drive wheels of the vehicle, there will need to be appropriate ratio control means for the variator, and such ratio control means will normally be responsive to engine and vehicle operating parameters and to a driver-operable control. Thus control of the variator ratio may be on the basis of input speed (engine speed, or variator input speed), output speed (vehicle speed, or transmission output speed), engine load (engine manifold vacuum, or throttle valve position), and driver control, for example a kickdown position of the vehicle accelerator pedal, for the transmission of peak engine power.

The input signals to the ratio control means can thereby be utilized to allow the vehicle engine to operate always at an appropriate speed for the prevailing conditions, for example at optimum efficiency for economy, and at maximum power (in response to a driver signal) when optimum performance is required.

Under overrun conditions, the ratio could permit engine braking up to maximum engine speed should the drive so require.

To assist the vehicle driver in maintaining an economical style of driving, a combined speedometer and tachometer can be of considerable advantage. For this purpose a calibrated dial having a vehicle speed scale and an engine speed scale may be provided with a pair of concentrically mounted indicator pointers which are each driven so that they are responsive to vehicle speed and engine speed respectively. Leading or lagging of the engine-speed pointer relative to the vehicle-speed pointer can thus indicate to the driver whether the vehicle is being operated inefficiently or economically, such combined speedometer and tachometer effectively indicating the overall gearing of the transmission mechanism.

The mechanical variator can in principle be of any of the currently known types, for example a pulley and chain (or belt) type, a Kopp type with friction drive by balls or the like, or a Perbury type with friction drive by pivotable discs. The pulley and chain type utilizing a drive chain working between variable-pitch V-section pulleys offers a number of advantages for vehicle applications, including good torque capacity. If greater capacity is required for a heavy-duty application, the mechanical variator can be combined with one or more further units of similar type connected in parallel with it. To reduce wear due to small ratio differences between the respective variators, a differential gear can be connected to the respective variators.

In a variable ratio power transmission mechanism in accordance with the present invention, the planetary gearsets steplessly extend the ratio spread of the mechanical variator, for example at least doubling the spread, with torque limited by overall transmission efficiency and variator capacity. In conjunction with an appropriate control system for the variator, the overall function is that of an optimizing ratio transmission.

IN THE ACCOMPANYING DRAWINGS

Figure 5:
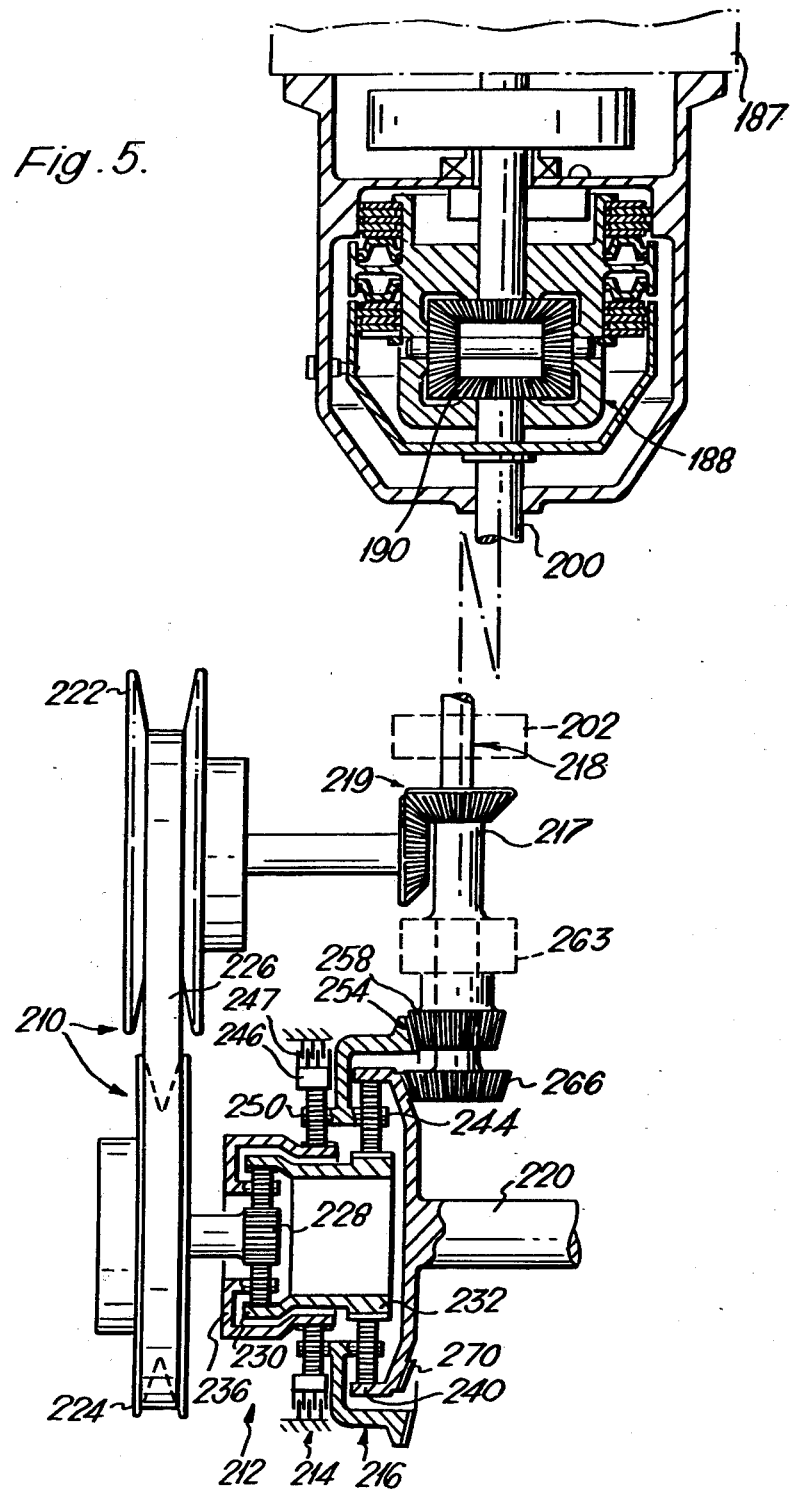
Figure 7:
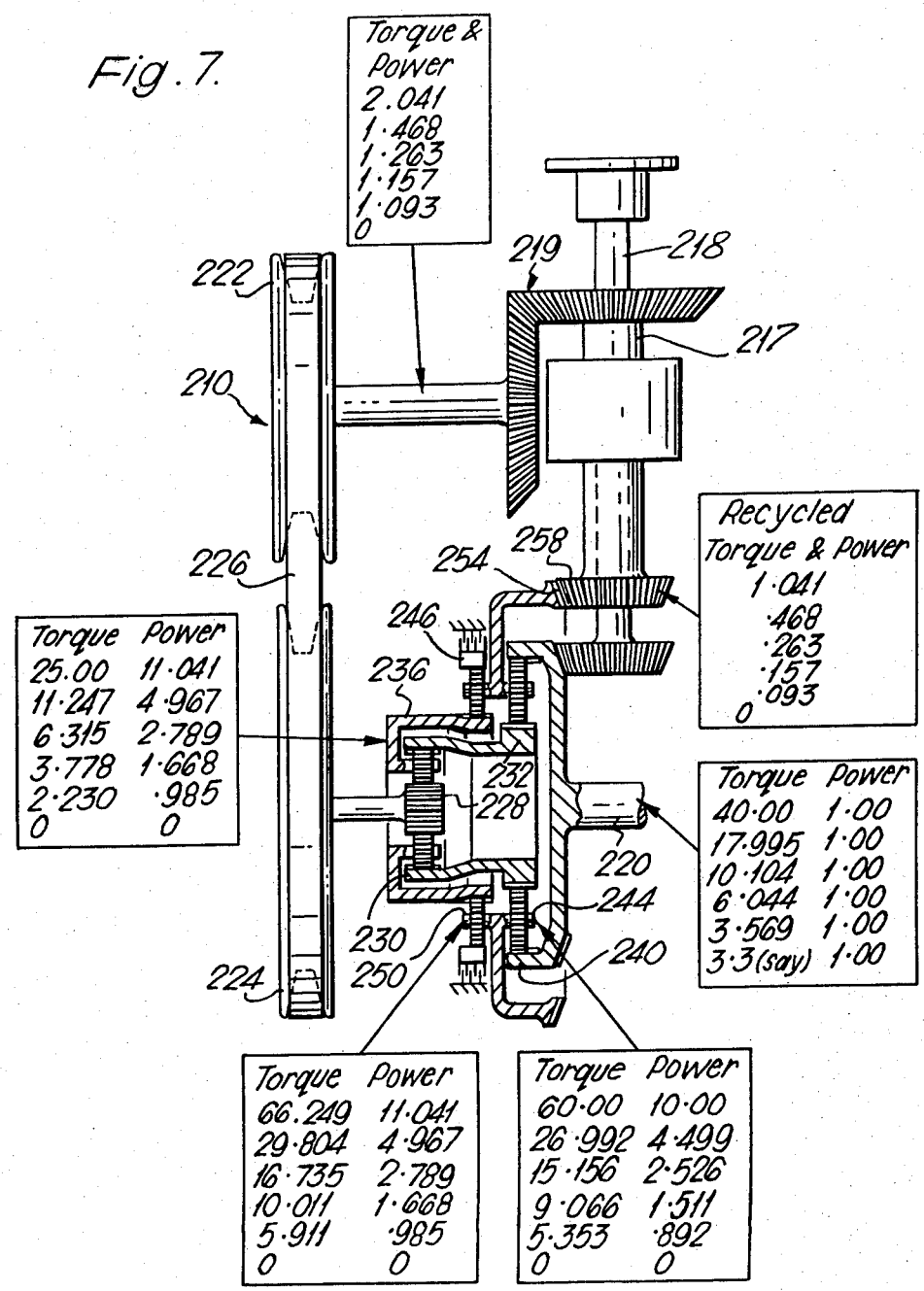
Figure 11:
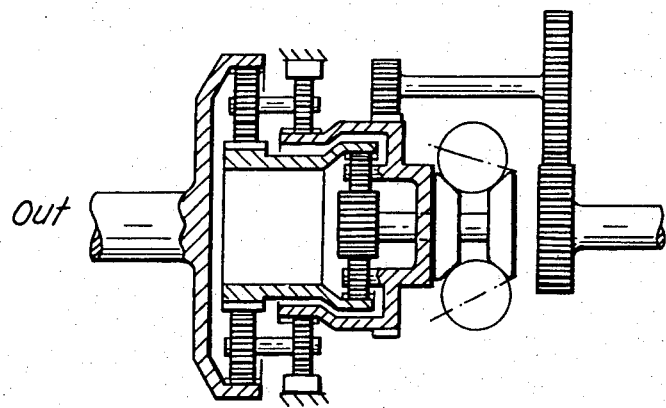
Figure 12:
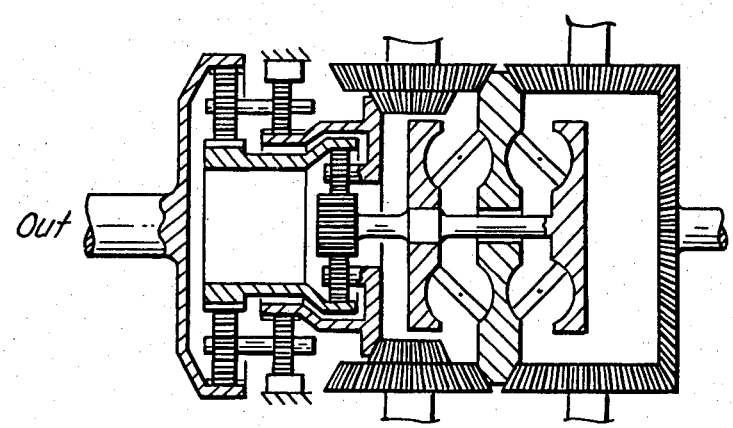
Figure 13:
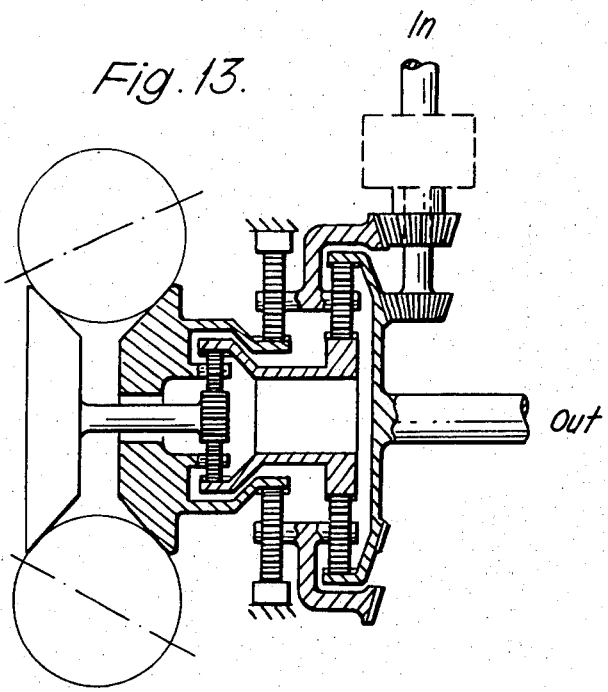
Figure 14:
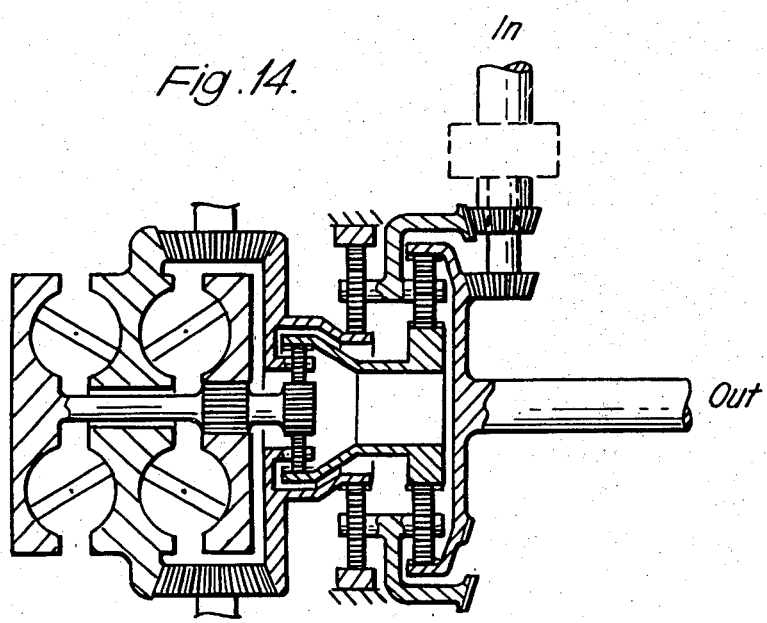
Figure 15:
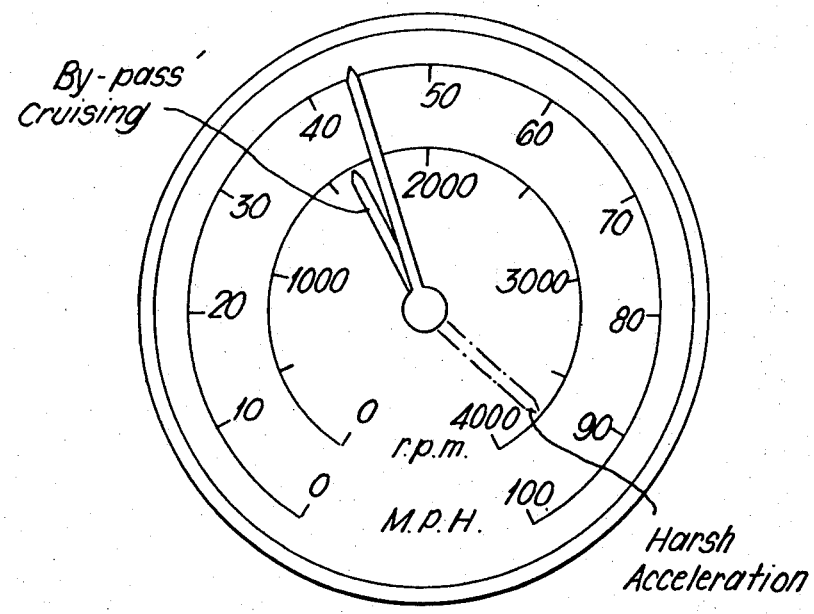
Figure 16:
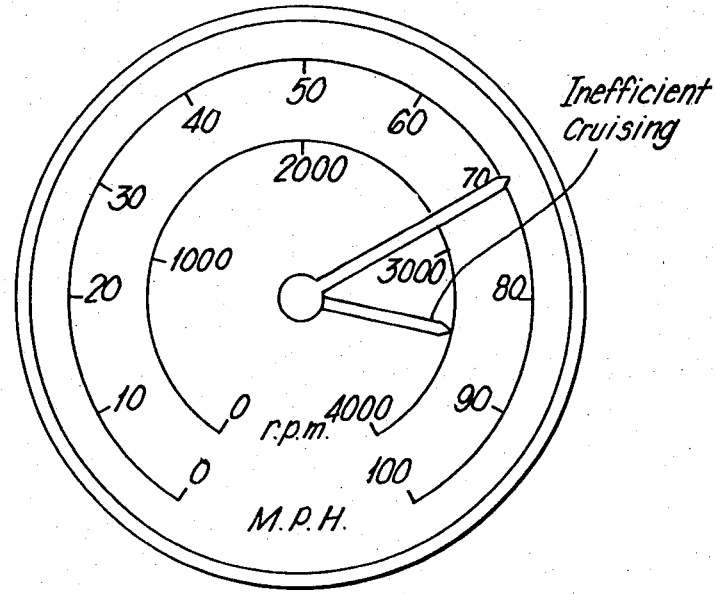
Figure 17:
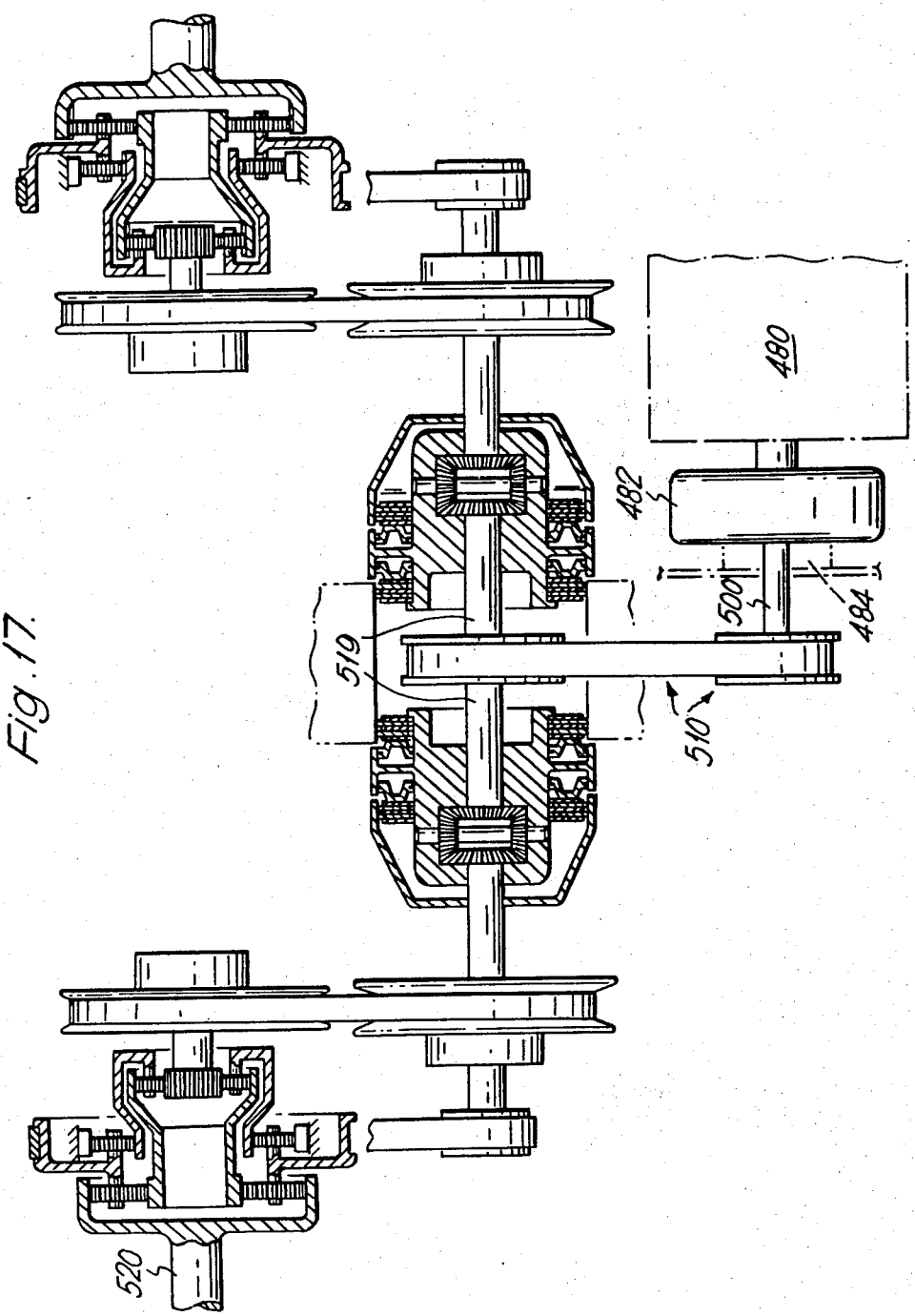

FIG. 7 gives, by way of illustration, values of torque and power transmitted for five variator ratios and a bypass condition at various parts of the FIG. 5 configuration;

FIG. 8 illustrates a multivariator configuration;

FIGS. 9 to 12 illustrate the application of alternative forms of variator, all providing an output parallel to the input;

FIGS. 13 and 14 illustrate two further applications of alternative forms of variator, providing an output perpendicular to the input;

FIGS. 15 and 16 illustrate a preferred form of combined speedometer and tachometer for the variable ratio power transmission mechanism; and FIG. 17 illustrates the variable-ratio power transmission mechanism in an application as a steerable transmission for a tracklaying vehicle.

Figure 1:
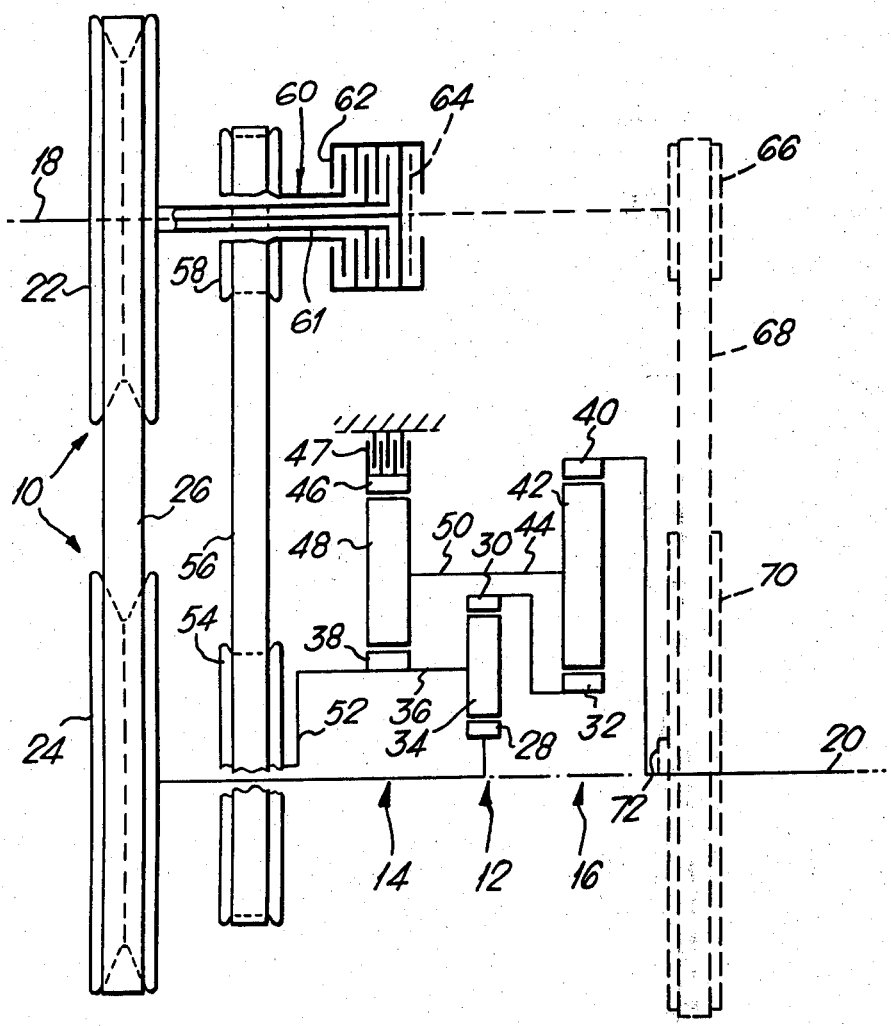
FIG. 1 illustrates in schematic form a first embodiment of a variable ratio power transmission mechanism in accordance with the present invention.

In FIG. 1 of the drawings, a first embodiment of a variable ratio power transmission mechanism in accordance with the present invention is shown as comprising a mechanical variator 10 and interconnected first, second and third planetary (specifically, epicyclic) gearsets 12, 14 and 16 respectively, for the transmission of drive torque from an input shaft 18 at steplessly variable ratios to an output shaft 20.

The mechanical variator 10 is of known construction and comprises an input member in the form of a variable-pitch V-section pulley 22, an output member in the form of a corresponding variable-pitch V-section pulley 24, and a drive chain 26 interconnecting the two variable-pitch pulleys. To vary the ratio, ratio control means (not shown) responsive to operating parameters is effective to reduce the pitch of one of the pulleys and correspondingly increase the pitch of the other pulley, such that the drive chain is constrained to work at a greater radius on the one pulley and at a correspondingly lesser radius on the other pulley, so steplessly varying the transmission ratio of the variator. A ratio spread of about 6:1 is obtainable from the variator.

The output pulley 24 of the variator is connected to drive a sun gear 28 of the first planetary gearset 12, which constitutes an input gearset. A ring gear 30 of the first planetary gearset is connected to drive a sun gear 32 of the third planetary gearset 16, which constitutes an output gearset. The sun gear 28 and ring gear 30 of the input gearset 12 mesh with planetary pinions 34 which are rotatably mounted on a planet carrier 36 that is drive-connected to a sun gear 38 of the second planetary gearset 14, which constitutes an intermediate gearset.

A ring gear 40 of the output gearset 16 is connected to drive the output shaft 20. The sun gear 32 and ring gear 40 of the output gearset mesh with planetary pinions 42 which are rotatably mounted on a planet carrier 44. A ring gear 46 of the intermediate gearset 14 is connected by way of a brake or multiple disc brake 47 to a fixed transmission housing portion. The sun gear 38 and ring gear 46 of the intermediate gearset 14 mesh with planetary pinions 48 which are rotatably mounted on a planet carrier 50 that is connected to the planet carrier 44 of the output gearset 16.

The planet carrier 36 of the input gearset 12, together with the sun gear 38 of the second planetary gearset 14, has a drive connection 52 to a first goorved pulley 54 that is connected by way of a drive chain 56 to a second grooved pulley 58 coaxially surrounding a part of the input shaft 18. The second grooved pulley 58 is selectively connectable to the variator input pulley 22 via a drive connection 60, a clutch 62 and a pulley shaft 61. When clutched together, both pulleys become connected to the input shaft 18. The parts 52 to 62 provide a torque recirculation connection between the planet carrier 36 and the input pulley 22 of the variator.

As an optional but preferred feature, a selectively operable bypass connection is provided, for establishing a direct-drive connection between the input and output shaft 18 and 20. For this purpose, a second multiplate clutch 64 is selectively actuable to connect the input shaft 18 to a grooved input pulley 66 which is connected by way of a drive chain 68 to a grooved output pulley 70 that is coaxial with the output shaft 20 and has a drive connection 72 to the output shaft. Engagement of the bypass clutch 64 disengages the variable-mode clutch 62.

Figure 2:
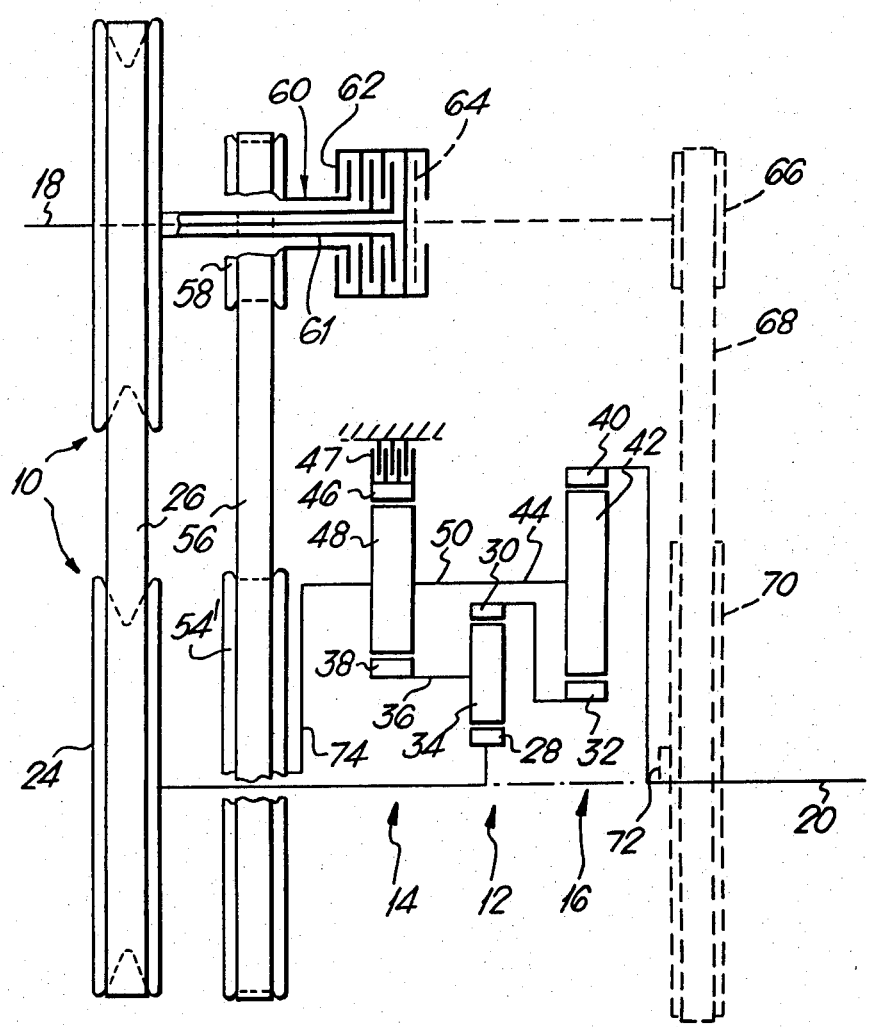
FIG. 2 illustrates in schematic form a second embodiment of a variable ratio power transmission mechanism in accordance with the present invention.

In FIG. 2 of the drawings, there is shown a second embodiment of a variable ratio power transmission mechanism in accordance with the present invention which is in most respects identical with the FIG. 1 embodiment, similar parts in the two embodiments being designated by like reference numerals. In the FIG. 2 embodiment, however, the torque recirculation connection involves a drive connection 74 from the interconnected planet carriers 50 and 44 of the intermediate and output gearsets 14 and 16 to a first grooved pulley 54', instead of the drive connection 52 from the planet carrier 36 to the first grooved pulley 54 in the FIG. 1 embodiment.

A selectively operable bypass connection (parts 64 to 72) is an optional but preferred feature of the FIG. 2 embodiment also.

In both the FIG. 1 and the FIG. 2 embodiments, the ratio of the number of teeth on the ring gear to the number of teeth on the sun gear of the input, intermediate and output gearsets 12, 14 and 16 may for example be 4:1, 1.65:1 and 2:1 respectively.

The operation of the FIG. 1 embodiment will now be described, operation of the FIG. 2 embodiment being generally similar. With the first multiplate clutch 62 engaged, input torque from the input shaft 18 is supplied to the input pulley 22 of the variator 10, from where it is transmitted by the drive chain 26 to the output pulley 24, at a ratio determined by the prevailing pitches of these two variable-pitch pulleys, and thereby applied to the sun gear 28 of the input gearset 12. With the ratios as specified, the carrier 36 of the input gearset, and accordingly also the sun gear 38 of the intermediate gearset 14, will rotate in the same direction as the sun gear 28, at a speed which is proportional to the speed of the input shaft 18, and with a torque which is increased in accordance with the ratio of the input gearset 12, thus $T_c = T_s(R/S+1)$, where $T_c$ is the torque on the carrier 36, $T_s$ is the torque on the sun gear 28, and R and S are the numbers of teeth on the ring gear 30 and sun gear 28 respectively. The ring gear 30 of the input gearset 12, and accordingly also the sun gear 32 of the output gearset 16, will have a torque reaction which is in the opposite direction to the torque on the sun gear 28 of the input gearset, and a direction of rotation which for approximately 95% from the low-speed end of the variator range will be the same as that of the sun gear 28, with the ring gear 30 becoming stationary at the 95% value, and rotating in the opposite direction for the uppermost 5% of the range. The percentage would differ for different epicyclic and variator ratios.

With torque on the sun gear 38 of the intermediate gearset 14 as already mentioned, and with the brake 47 engaged to hold the ring gear 46 of the intermediate gearset 14 stationary to provide reaction, the planetary pinions 48 of the intermediate gearset will supply torque to the twin carriers 50 and 44, in a torque path from the planetary pinions 34 of the input gearset 12. Since, as also mentioned, the sun gear 32 of the output gearset 16 is subject to reaction torque in the opposite direction to the torque on the input sun gear 28, reaction is thereby provided for the planetary pinions 42 of the output gearset to produce a torque on the output ring gear 40, for driving the output shaft 20.

However, the torque available at the output ring gear 40 is limited by the torque reaction created at the sun gear 32 and any theoretical surplus torque at the carrier 44 is in fact taken off at the sun gear 38 and recirculated by way of the torque recirculation connection 52 to 62 to the input member 22 of the mechanical variator 10. There is in fact an instantaneous reaction to balance forces, and the greater the torque ratio created by the variator, the greater is the amount of recirculated balancing torque fed back through the variator and acting to increase the output torque.

When the variator 10 reaches a minimum ratio condition, the first multiplate clutch 62 can be disengaged and the optional second multiplate clutch 64 can be engaged to establish the bypass condition providing a direct mechanical connection between the input and output shafts 18 and 20. This effectively unloads the variator and variable mode elements, so eliminating losses inherent in torque recirculation.

Even so, the variator and variable mode elements will be subject to spin losses, which may be considered excessive, since the parts concerned would be rotating at speeds consistent with the production of the normal range of transmission output speeds from the variable mode elements. To reduce such losses, (and also reduce wear on the variator) it is only necessary to release the brake 47 in the bypass mode, so allowing the variator and variable mode elements to rotate freely together, with the actual speed of the variator (in the example quoted) being thereby reduced to approximately 11% of its previous value.

The brake 47 is shown in FIG. 1 as a plate type brake. However, it could alternatively be a high-capacity dog clutch, provided with a conventional form of synchronizing elements to facilitate engagement.

Operation of the FIG. 2 embodiment is generally similar to that of the FIG. 1 embodiment, with the surplus torque being taken off direct from the twin carriers 50 and 44 instead of from the sun gear 38 as in the FIG. 1 embodiment. The speed of the twin carriers 50 and 44 is proportional to input speed (although different from the speed of the sun gear 38).

The FIG. 1 embodiment is preferred because the torque for recirculation is taken off further upstream in the torque path, thereby reducing losses in the intermediate gearset 14. Also, a more practicable gear ratio of, for example, 2:1 can be used in the torque recirculation connection, in contrast to the approximate 4:1 ratio which is required in the FIG. 2 embodiment.

Figure 3:
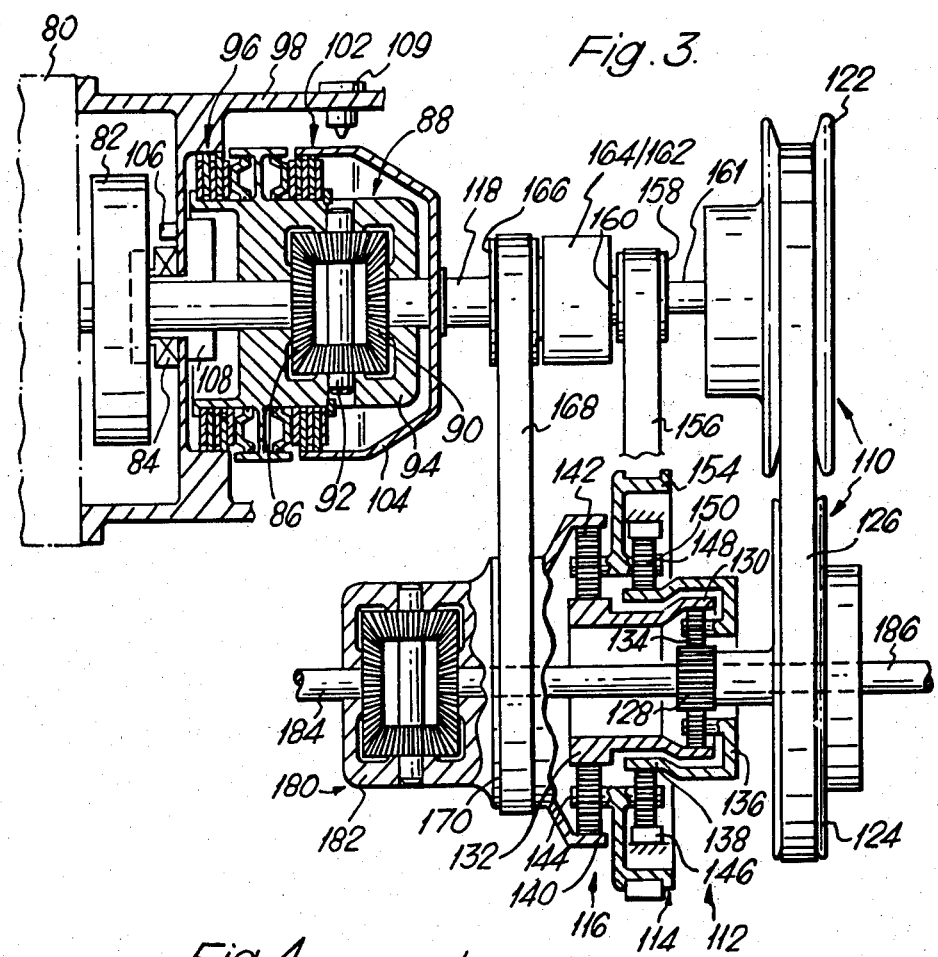
FIGS. 3 to 5 are fragmentary schematic views illustrating possible configurations of the variable-ratio power transmission mechanism in accordance with the present invention as applied to a motor vehicle transmission.

In FIG. 3 of the drawings, there is shown a first practical configuration of a variable ratio power transmission mechanism in accordance with the present invention, corresponding functionally to the FIG. 2 embodiment already described.

As is shown in FIG. 3, an engine 80 is connected to supply torque to a hydraulic coupling and adjacent torsion damper, together designated 82, the coupling being provided with a selectively operable lock-up clutch (not shown). For a specific application in special circumstances, the fluid coupling could be replaced by a hydrodynamic torque converter.

A hydraulic pump 84 is driven at engine speed by being directly connected to the rotary casing of the hydraulic coupling. Output torque from the hydraulic coupling is supplied to an input gear 86 of a forward-/reverse differential unit 88. Pinion gears meshing with the input gear 86 and also with a differential output gear 90 are rotatably mounted on a cross pin 92 carried by a rotary differential case 94. A friction brake 96 having alternate friction plates connected to the rotary differential case 94 and to a stationary transmission housing 98 is selectively engageable, by supply of fluid to an associated annular hydraulic cylinder, to hold the differential case 94 stationary such that the output gear 90 and a drive shaft 118 connected to it are driven in the opposite direction to the input and at the same speed, this being the reverse drive condition. In a generally similar fashion, a friction clutch 102 is selectively engageable, by supply of fluid to a second annular hydraulic cylinder, to connect the differential case 94 to a clutch drum 104 fixed to the drive shaft 118, to establish a forward drive condition in which the drive shaft is driven in the same direction and at the same speed as the input. With neither the brake 96 nor the clutch 102 engaged, a neutral condition is established in which there is no torque transmitted from the engine to the drive shaft 118.

A solenoid 106 and valve block 108 are provided adjacent the hydraulic pump 84 for selective pressurization of the hydraulic cylinders in response to a drive signal. A locking pawl 109 is selectively engageable with the clutch drum 104 to lock the transmission when required.

The drive shaft 118 is connected, in a configuration including bevel gears, to a mechanical variator 110 and first, second and third planetary (epicyclic) gearsets 112, 114 and 116 having connections as described in relation to FIG. 2.

The mechanical variator 110 comprises an input member in the form of a variable pitch V-section pulley 122, an output member in the form of a corresponding variable pitch V-section pulley 124, and a drive chain 126 interconnecting the two variable pitch pulleys. To vary the ratio, ratio control means (not shown) responsive to operating parameters is effective to reduce the pitch of one of the pulleys and correspondingly increase the pitch of the other pulley, such that the drive chain is constrained to work at a greater radius on the one pulley and at a correspondingly lesser radius on the other pulley, so steplessly varying the transmission ratio of the variator. A ratio spread of about 6:1 is obtainable from the variator.

The output pulley 124 of the variator is connected to drive a sun gear 128 of the first planetary gearset 112, which constitutes an input gearset. A ring gear 130 of the first planetary gearset is connected to drive a sun gear 132 of the third planetary gearset 116, which constitutes an output gearset. The sun gear 128 and ring gear 130 of the input gearset 112 mesh with planetary pinions 134 which are rotatably mounted on a planet carrier 136 that is drive-connected to a sun gear 138 of the second planetary gearset 114, which constitutes an intermediate gearset.

A ring gear 140 of the output gearset 116 is connected to drive an output which includes a pulley 170. The sun gear 132 and ring gear 140 of the output gearset mesh with planetary pinions 142 which are rotatably mounted on a planet carrier 144. A ring gear 146 of the intermediate gearset 114 is connected by way of a brake (omitted for clarity, but corresponding to the brake 47 in FIG. 2) to a fixed transmission housing portion. The sun gear 138 and ring gear 146 of the intermediate gearset 114 mesh with planetary pinions 148 which are rotatably mounted on a planet carrier 150.

The planet carriers 144 and 150 of the output and intermediate gearsets 116 and 114 respectively are interconnected, and include a flange-like extension portion constituting a first grooved pulley 154. The first grooved pulley 154 is connected by way of a drive chain 156 to a second grooved pulley 158 coaxially surrounding a part of the input shaft 118. The second grooved pulley 158 has a drive connection 160 to a first multiplate clutch 162, which is selectively engageable to provide a drive connection via a shaft 161 to the input pulley 122 of the variator 110 and to the input shaft 118. The parts 154 to 162 provide a torque recirculation connection between the twin planet carriers 144, 150 and the input pulley 122 of the mechanical variator 110.

Generally, as described in relation to FIG. 2, the FIG. 3 embodiment includes a selectively operable bypass connection, for establishing a direct drive connection between the input shafts 118 and the pulley 170 forming part of the output. For this purpose, a second plate-type clutch 164 is selectively actuable to connect the input shaft 118 to a grooved input pulley 166 which is connected by way of a drive chain 168 to the output pulley 170, which is a grooved pulley.

The grooved output pulley 170 is drive connected to an output differential unit 180 which has a rotary housing 182 and the usual differential gear arrangement of a cross pin and intermeshing pinion gears, this differential unit 180 having oppositely extending output shafts extended parallel to the input shaft 118. One of these output shafts is a shaft 184, and the other is a shaft 186 that extends coaxially through the gear units 116, 114 and 112 and the output member 124 of the mechanical variator 110.

As in the case of the FIG. 2 embodiment, the ratio of the number of teeth on the ring gear to the number of teeth on the sun gear of the input, intermediate and output gearsets 112, 114 and 116 may, for example, be 4:1, 1.65:1 and 2:1, respectively.

The operation of the FIG. 3 embodiment is generally similar to that described for the FIG. 2 embodiment. Thus, with the first clutch 162 engaged, input torque from the input shaft 118 is supplied to the input pulley 122 of the mechanical variator 110, from where it is transmitted by the drive chain 126 to the output pulley 124, at a ratio determined by the prevailing pitches of these two variable pitch pulleys, and thereby applied to the sun gear 128 of the input gearset 112. With the ratio as specified, the carrier 136 of the input gearset, and accordingly also the sun gear 138 of the intermediate gearset 114, will rotate in the same direction as the sun gear 128, at a speed which is proportional to the speed of the input shaft 118, and with a torque which is increased in accordance with the ratio of the input gearset 112, thus $T_c = T_s(R/S + 1)$, where $T_c$ is the torque on the carrier 136, $T_s$ is the torque on the sun gear 128 and R and S are the numbers of teeth on the ring gear 130 and sun gear 128, respectively. The ring gear 130 of the input gearset 112, and accordingly also the sun gear 132 of the output gearset 116, will have a torque reaction which is in the opposite direction to the torque on the sun gear 128 of the input gearset, and a direction of rotation which for approximately 95% from the low speed end of the variator range will be the same as that of the sun gear 128, with the ring gear 130 becoming stationary at the 95% value, and rotating in the opposite direction for the uppermost 5% of the range. The percentage would differ for different epicyclic and variator ratios.

With torque on the sun gear 138 of the intermediate gearset 114 as already mentioned, and with the brake engaged to hold the ring gear 146 of the intermediate gearset 114 stationary to provide reaction, the planetary pinions 148 of the intermediate gearset will supply torque to the twin carriers 150 and 144, in a torque path from the planetary pinions 134 of the input gearset 112. Since, as also mentioned, the sun gear 132 of the output gearset 116 is subject to reaction torque in the opposite direction to the torque on the input sun gear 128, reaction is thereby provided for the planetary pinions 142 of the output gearset to produce a torque on the output ring gear 140, for driving the output differential unit 180.

However, the torque available at the output ring gear 140 is limited by the torque reaction created at the sun gear 132, and the theoretical surplus torque is in fact taken off at the twin carrier pulley 154 and recirculated by way of the torque recirculation connection 154 to 162 to the input member 122 of the mechanical variator 110. There is an instantaneous reaction to balance forces, and the greater the torque ratio created by the variator, the greater is the amount of recirculated balancing torque fed back through the variator and acting to increase the output torque.

When the mechanical variator 110 reaches a minimum ratio condition, the first clutch 162 can be disengaged and the second clutch 164 can be engaged to establish the bypass condition providing a direct mechanical direction between the input shaft 118 and the output. This effectively unloads the mechanical variator and variable mode elements, so eliminating losses inherent in torque recirculation.

To additionally avoid spin losses in the mechanical variator and variable mode elements, as in the case of the FIG. 2 embodiment it is possible to release the brake in the bypass mode, so allowing the mechanical vibrator and variable mode elements to rotate freely together, and thereby not only reduce spin losses but also reduce wear on the mechanical variator.

Figure 4:
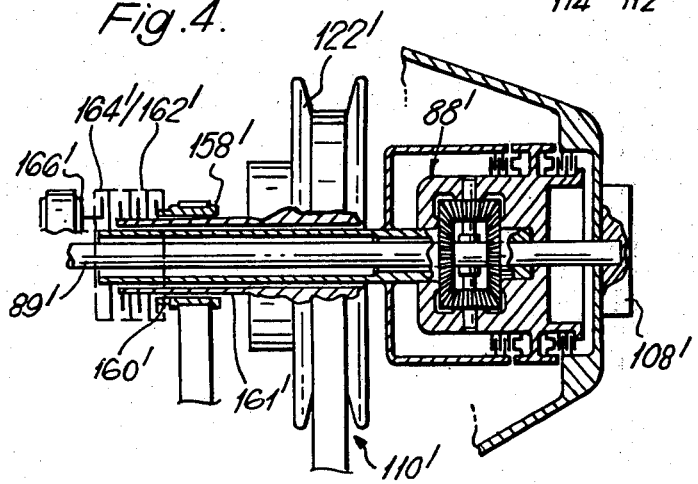

FIG. 4 is a fragmentary view illustrating a further embodiment which is a slightly modified form of the FIG. 3 configuration. The parts in FIG. 4 which are similar to those in FIG. 3 are assigned in the same reference numerals as in FIG. 3, but primed. In the FIG. 4 embodiment, the forward/reverse unit 88' and valve block 108' are moved outboard of the input member 122' of the mechanical variator 110' (and the adjacent grooved pulley 158', clutches 162'/164', and grooved pulley 166') and driven by a quill shaft 89' from the hydraulic coupling (not shown in FIG. 4).

The FIG. 3 and FIG. 4 layouts are each usable for a four-wheel drive vehicle, with the output shafts 184 and 186 being used as front and rear propeller shafts. In this application the differential gears could suitably be replaced by epicyclic units, to apportion torque according to axle loading.

FIG. 5 illustrates a further practical configuration of a variable ratio power transmission mechanism in accordance with the present invention, which corresponds functionally to the FIG. 2 embodiment already described, but is a configuration in which the axis of rotation of the input member of the variator extends at right angles to the axis of rotation of a rotary input drive member, and parallel to the axis of rotation of an output member of the transmission mechanism.

The embodiment of a variable ratio power transmission mechanism in accordance with the present invention which is shown in FIG. 5 includes an engine 187 which is connected, as described in relation to FIG. 3, to supply torque to a hydraulic coupling and adjacent torsion damper, the coupling being provided with a selectively operable lock-up clutch (not shown), and a hydraulic pump driven at engine speed being directly connected to a rotary casing of the hydraulic coupling. As in the case of the FIG. 3 embodiment, also, output torque from the hydraulic coupling is supplied to an input gear of a forward/reverse differential unit 188. A differential output gear 190 of this forward/reverse differential unit 188 is connected to a drive shaft 200.

The drive shaft 200 is connected to drive a control unit 202 and is connected directly or indirectly to a rotary drive member constituted by a hollow input shaft 218 which by means of a bevel gearset 219 drives an input drive shaft and variable pitch input pulley 222 of a mechanical variator 210. A variable pitch output pulley 224 of the mechanical variator 210 is connected by means of a drive chain 226 to the input pulley, and supplies drive torque by way of an output drive shaft to an input sun gear 228 of a first planetary gearset 212.

The first planetary gearset 212 constitutes an input planetary gearset which cooperates with second and third planetary gearsets 214 and 216 constituting intermediate and output planetary gearsets, respectively.

The first, second and third planetary gearsets 212, 214 and 216 have parts which correspond to, and cooperate in a similar manner to, the corresponding parts of the first, second and third planetary gearsets 12, 14 and 16 described in relation to the FIG. 2 embodiment, to supply drive torque to an output shaft 220.

Thus, in the FIG. 5 embodiment, the output member 224 of the mechanical variator 210 is connected to supply torque to a sun gear 228 of the input planetary gearset 212; a ring gear 246 of the intermediate planetary gearset 214 can be selectively held stationary by a grounding brake 247; and provision is made for recirculating torque from twin carriers 244 and 250 of the intermediate and output planetary gearsets 214 and 216 respectively by means of a flange-like annular extension 254 of the twin carriers, this annular extension being formed with bevel teeth in a similar fashion to a crown wheel. These bevel teeth cooperate with a further set of bevel teeth 258 to provide a return torque path for recycling torque by way of a clutch 263, a shaft 217 and the bevel gearset 219 to the input member 222 of the mechanical variator 210.

The bypass clutch 263 is selectively operable to connect the input shaft 218 either to the return bevel gearset 254, 258 and input bevel gearset 219 via shaft 217 or to a bypass bevel pinion 266 that meshes with external bevel teeth 270 on an output ring gear 240 of the output planetary gearset 216.

The control unit 202 situated on the drive shaft 200 is responsive to road speed, engine speed, engine load and a driver signal, and provides for actuation of the variable pitch pulleys 222 and 224 and the bypass clutch 263.

Operation of the FIG. 5 configuration is basically similar to that of the FIG. 2 embodiment.

Direct drive could alternatively be achieved by including provision for clutching together the output ring gear 240 of the output planetary gear 216 and a sun gear 232 of the output planetary gearset, with simultaneous declutching of the mechanical variator 210 from the shaft driving it. However, such an arrangement is less desirable, since it would tend to restrict the minimum ratio or increase losses in the variable mode.

Figure 6:
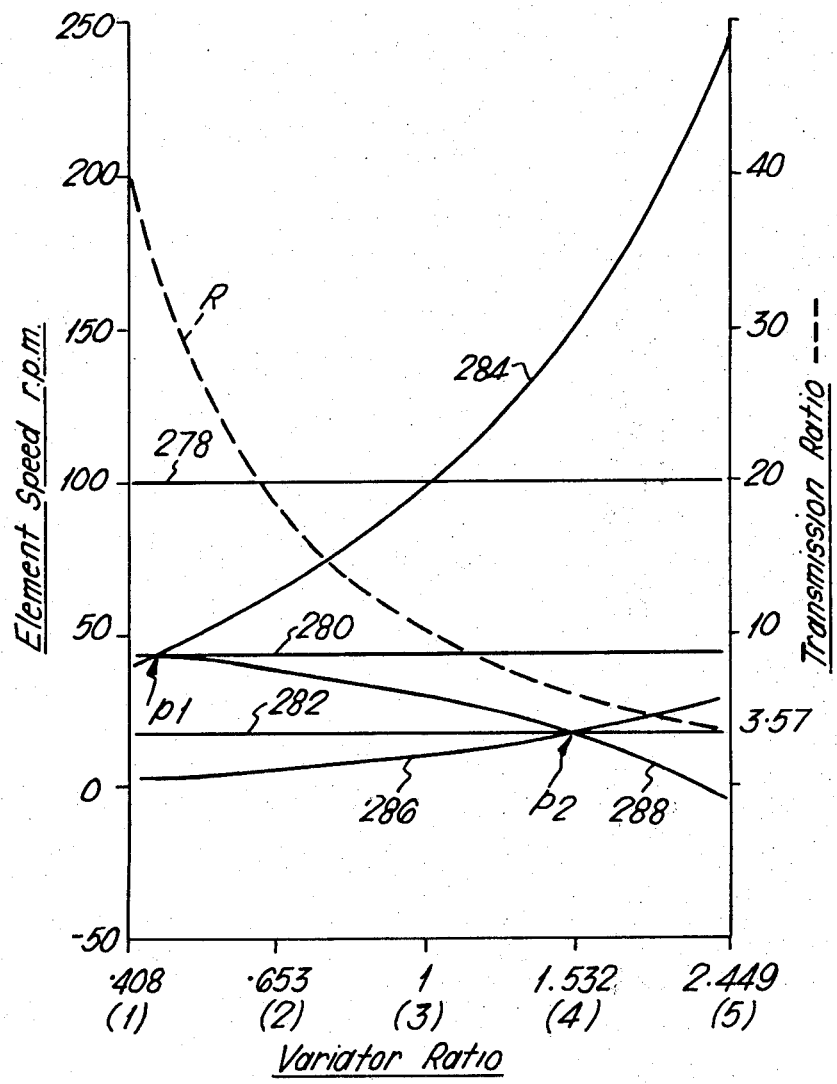
FIG. 6 is a graph of element speed plotted against variator ratio to illustrate the relative speeds of the elements of three interconnected planetary gearsets in the FIG. 5 configuration.

FIGS. 6 and 7 of the drawings illustrate respectively, the speed relationships, and the torque and power transmitted, for various of the elements in the FIG. 5 configuration, values being given at five variator ratios in both FIGS. 6 and 7, with values for the bypass condition being additionally given in FIG. 7. The variator ratio spread is 6:1, and the ratio of the number of teeth on the ring gear to the number of teeth on the sun gear of the input, intermediate and output gearsets 212, 214 and 216 is 4:1, 1.65:1 and 2:1, respectively. The bevel gearset 219 is assumed to have a 1:1 ratio, and the values given ignore losses in the system.

In FIG. 6, element speeds are shown in rpm for the range of variator ratios, a straight line curve 278 at 100 rpm denoting the speed of the input shaft 218, a straight line curve 280 at a lower speed denoting the speed of an input carrier 236, and a straight line curve 282 at a still lower speed denoting the speed of the twin carriers 244 and 250. A curve 284 which rises steeply with increasing variator ratio represents the speed of the input sun gear 228. A curve 286 which rises gently with increasing variator ratio represents the speed of the output ring gear 240 and output shaft 220. A falling curve 288 represents the speed of an input ring gear 230. The falling interrupted line curve R represents the overall transmission ratio. The points P1 and P2 denote zero pitch line velocity in the input and output gearsets 212 and 216, respectively.

In FIG. 7, the reference numerals for the various parts correspond to the reference numerals used in FIG. 5.

FIG. 8 of the drawings illustrates a multivariator arrangement involving a multiplicity of mechanical variators in the context of a variable ratio power transmission mechanism in accordance with the present invention. Broadly, a simple differential is applied between similar variators and a planetary differential where dissimilar variators are paired, or where two are paired with a third, such that the dissimilar loading thereby presented can be balanced by the planetary differential.

Specifically, in the FIG. 8 arrangement, an input shaft 300 is connected to a number of input members 301a, 301b and 301c of cone-type variators, and output members 302a, 302b and 302c are connected to their respective input members by belts or chains 303a, 303b and 303c.

Variators a and b are connected to side gears 304 of a differential 305, and the combined power is taken out via differential pinions 306, a cross pin 307 and a shaft 308.

To couple with a third variator c, torque on the shaft 308 is fed to a ring gear 309 of an epicyclic differential 310, and is balanced by a sun gear 311 connected to an output member 302c. The total torque is then taken out via a planetary carrier 312 and output shaft 313.

A combination of this arrangement is possible, to cater for any likely combination of variators.

FIGS. 9 to 14 of the drawings illustrate the application of various alternative known forms of variator, in configurations providing an output parallel to the input (FIGS. 9 to 12) or perpendicular to the input (FIGS. 13 and 14), in the context of a variable ratio power transmission mechanism in accordance with the present invention.

In each case the same bsic principle applies, namely that the three planetary gearsets are acted upon by the variator such that: the output from the variator is directly connected to the sun gear of the first gearset; torque is recirculated to the variator input member by a suitably geared connection from any carrier of the three gearsets; and prime mover inputs are fed to any carrier of the three gearsets or to variator input.

In this way a large number of variator types and arrangements are made available to achieve the basic three layouts; namely parallel, perpendicular and coaxial; further, if required for a specific application, an angle drive layout can readily be achieved.

FIGS. 15 and 16 of the drawings illustrate two conditions of a combined speedometer and tachometer which has already been generally described.

FIG. 17 of the drawings illustrates one possible configuration of a steerable transmission for a track-laying vehicle, utilizing a variable ratio power transmission mechanism in accordance with the present invention.

As is shown in FIG. 17, a prime mover 480 is connected to drive a fluid coupling 482 which transmits torque to a shaft 500 and a hydraulic pump 484. A system of toothed pulleys and chain 510 transmits drive to a second shaft 519 which divides the power between each half of the transmission.

Considering one side only (since the other acts similarly), the second shaft 519 is fixed to a side gear of a differential gearset and from this point all downstream components operate as previously described for FIG. 3 except that the bypass feature is not required.

Drive is taken out via an output shaft 520 to a track driving cog (not shown) on the respective side of the vehicle.

Since the symmetrically opposite half can act independently, the overall unit can operate to provide the required drive, and to provide the advantages inherent in the present invention, and also makes available the following features: differential speeds of tracks to steer vehicles made achievable by elimination or locking of a balancing differential unit; contra-rotation of tracks, for pivoting made available by selectively operating the reversing units; equal performance in forward or reverse; and "single-handed" joystick control possible for direction, acceleration and steering.

A variable ratio power transmission mechanism in accordance with the present invention such as has been described in the foregoing offers a number of potential advantages:

(1) The transmission is fully automatic, and the conjoint use of a hydraulic coupling facilitates smooth take-up of drive and a "hold" condition. To reduce coupling losses the coupling could be designed to lock up under predetermined conditions.

(2) In the variable mode the transmission is continuously variable (steplessly variable). Power can be applied throughout the ratio spread, and when shifting to or from the bypass mode. Shifts should be imperceptible, especially using a bypass ratio almost the same as the minimum variable ratio.

(3) Wide ratio spreads are available. Whereas variator ratios are usually limited to about 6:1, application of the present invention makes it possible to double this spread overall, and facilitate engine operation at optimum efficiency during operation of the vehicle, with maximum power being available at any time (in response to a driver signal) for maximum acceleration.

(4) Overall operating efficiency is potentially good, and superior to that of conventional hydrodynamic units and the associated final drive gears.

(5) Bypass efficiency can be superior to the efficiency of conventional hypoid axles by virtue of more suitable loading which need not cater for maximum output torques. The potential of bevel gears for relatively high efficiency can be effectively utilized.

(6) A variety of vehicle applications are possible, including transverse-engined front wheel drive, conventional front-engined rear wheel drive, and four-wheel drive vehicles. A layout is possible allowing the floor height of a rear wheel drive van to be as low as in a front wheel drive van, by placing individual drive units at the wheels, with drive to the units being by universally-jointed shifts from a differential mounted from the body, and these shafts entering the units substantially below wheel center height. The output may be eccentric to the wheel center to accommodate a pulley-type variator within the wheel confines, with the output driving a gear concentric with the wheel. In this application, brake drums could either be conventionally located adjacent the respective wheels or be located inboard of the respective drive units.

(7) The engine torque reaction effect on a rear wheel drive vehicle will be less because only engine torque is transmitted through the driveline. Specifically, at high output torques there will be less tendency for the right-hand rear wheel to lift and spin at high torques, and there will be virtually no cab lurch or driveline orbiting on commercial vehicle applications. Also, with the high output torques available from this unit, and the compactness which is achievable, the unit could replace the less efficient hub reduction type of rear axle currently necessary for gradeability and adequate ground clearance.

(8) Maximum engine braking power can be obtained for downhill descents.

(9) Higher efficiency of the transmission could avoid the need for oil coolers used with conventional hydrodynamic drive units.

Also, substantial benefits are obtainable with respect to the following:

(a) Economy—up to 20% fuel savings are theoretically possible using appropriate gearing. Improved aerodynamics and reduction in cruising speeds could promote further increase in ratio spreads.
(b) Acceleration—maximum power always available.
(c) Convenience—no gearshifting.
(d) Refinement—lower engine speed for cruising; improved driveability; no transmission snatch.
(e) Safety—no stalling or missed gears; maximum acceleration available; reduced cab lurch; less tendency to wheelspin; full engine braking capacity available.
(f) Layout—potential for elimination of gearbox, floor-mounted gearshift lever and clutch pedal.

The embodiments of the invention in which an exclusive property or privilege is claimed are defined as follows:

1. A variable ratio power transmission mechanism in which a rotary drive member is connected to drive an input member of a mechanical variator that is operable to provide a steplessly variable ratio drive at an output member of the variator, the output member of the variator is connected to drive an output member of the transmission mechanism by way of interconnected first, second and third planetary gearsets each comprising first and second members meshing with at least one planetary member that is rotatably mounted on a carrier member, the first member of the first planetary gearset is connected to the output member of the variator, the second member of the first planetary gearset is connected to the first member of the third planetary gearset, the carrier member of the first planetary gearset is connected to the first member of the second planetary gearset, the second member of the second planetary gearset is held stationary, the carrier members of the second and third planetary gearsets are interconnected, the second member of the third planetary gearset is connected to the output member of the transmission mechanism, and one of the carrier members has a drive connection to the input member of the variator effective to recirculate torque from the said carrier member to the input member of the variator.

2. A variable ratio power transmission mechanism according to claim 1, in which the first member of each of the first, second and third planetary gearsets comprises a sun gear, and the second member of each of the first, second and third planetary gearsets comprises a ring gear.

3. A variable ratio power transmission mechanism according to claim 1 or 2, in which the ratios of the planetary gearsets are such that in operation the ratio spread available at the output member of the transmission mechanism is substantially greater than the ratio spread provided by the variator.

4. A variable ratio power transmission mechanism according to claim 1 or 2 in which the carrier member of the first planetary gearset has a drive connection as aforesaid to the input member of the variator.

5. A variable ratio power transmission mechanism according to claim 1 or 2 in which the carrier members of the second and third planetary gearsets have a drive connection as aforesaid to the input member of the variator.

6. A variable ratio power transmission mechanism according to claim 1 or 2, in which the rotary drive member is connected to be driven by an engine by way of a forward/reverse drive arrangement that is selectively operable to establish forward drive, reverse drive, or a neutral condition at the rotary drive member.

7. A variable ratio power transmission mechanism according to claim 1 or 2, in which a bypass clutch is selectively operable to establish a direct mechanical connection between the rotary drive member and the output member of the transmission mechanism.

8. A variable ratio power transmission mechanism according to claim 7, in which a brake is selectively operable to hold stationary a reaction member of the interconnected planetary gearsets in a variable mode, or allow free rotation in a bypass mode to reduce spin speeds of the members operative in the variable mode.

9. A variable ratio power transmission mechanism according to claim 8, in which the axis of rotation of the input member of the variator extends at right angles to the axis of rotation of the rotary drive member and parallel to the axis of rotation of the output member of the transmission mechanism, and the rotary drive member is connected by way of first and second bevel gears to the input member of the variator and to the said one of the carrier members respectively.

10. A variable ratio power transmission mechanism according to claim 8, in which the axis of rotation of the input member of the variator extends coaxially with respect to the axis of rotation of the rotary drive member and parallel to the axis of rotation of the output member of the transmission mechanism, and the drive connection between the said one of the carrier members and the input member of the variator comprises a drive chain or belt.

11. A variable ratio power transmission mechanism according to claim 10, in which the output member of the transmission mechanism is connected to drive a rotary housing of a differential mechanism having oppositely extending output shafts one of which extends through a central aperture in the sun gears of the planetary gearsets and in the output member of the variator.

* * * * *

UNITED STATES PATENT AND TRADEMARK OFFICE
CERTIFICATE OF CORRECTION

PATENT NO. : 4,402,237
DATED : September 6, 1983
INVENTOR(S) : Malcolm Tomlinson It is certified that error appears in the above—identified patent and that said Letters Patent is hereby corrected as shown below:

Column 5, line 3, "goorved" should read -- grooved --.

Column 9, line 56, "vibrator" should read -- variator --.

Signed and Sealed this

Seventeenth Day of April 1984

[SEAL]

Attest:

GERALD J. MOSSINGHOFF

Attesting Officer     Commissioner of Patents and Trademarks